Patented Jan. 30, 1951

2,539,910

UNITED STATES PATENT OFFICE 2,539,910

INSECTICIDAL COMPOSITION COMPRISING 1,4-DITHIOCYANOBUTENE-2

Herbert L. Johnson, Media, and Archibald P. Stuart, Norwood, Pa., assignors to Sun Oil Company, Philadelphia, Pa., a corporation of New Jersey No Drawing. Application June 10, 1948, Serial No. 32,255

3 Claims. (Cl. 167—22)

This invention relates to a novel insecticide composition. More particularly it relates to a novel insecticide composition containing as one of its effective ingredients 1,4-dithiocyanobutene-2.

It is well known that certain thiocyanogen compounds have insecticide properties. Dithiocyanate compounds are also known to have insecticide properties. However, there appears to be no predictability as to the insecticide value, if any, of a dithiocyanate until it has been prepared. Furthermore, even if prepared the dithiocyanate may possess some properties which will prevent its use as an insecticide even if it should have been found to be effective to kill insects.

The present applicant prepared three dithiocyano derivatives of butadiene. One of these is 2-methyl-1,4-dithiocyanobutene-2. This compound has a decidedly offensive odor and cannot be used for ordinary insecticide purposes for this reason. Another compound prepared is 2,3-dithiocyanobutane. This compound liberates free sulphur on standing. The third compound prepared is the subject of this invention, that is, 1,4-dithiocyanobutene-2. This compound does not possess the disadvantageous properties of the foregoing closely related compounds when used for ordinary insecticide purposes.

According to this invention there is provided a novel insecticide composition having as at least one of its essential active ingredients 1,4-dithiocyanobutene-2. According to the invention 1,4-dithiocyanobutene-2 admixed with, compounded with, or dissolved or emulsified in, a suitable carrier is effective to kill insects.

For example, 5% of 1,4-dithiocyanobutene-2 dissolved in 38% methyl ethyl ketone and 57% of petroleum spirits tested against the common housefly exhibited the properties of a grade AA insecticide. The following table summarizes results obtained employing the Standard Peet-Grady test:

| | |
|---|---|
| Total number of flies used | 1052 |
| Average per cent down 10 minutes | 98.3 |
| Grade designation | AA |
| Official test insecticide difference | +27.2 |
| Actual kill of official test insecticides | 68.3 |
| Total kill of sample tested | 95.5 |
| Knockdown of official test insecticide 10 minutes | 98.2 |

A test of methyl ethyl ketone and petroleum spirits indicates that the insecticidal efficacy of the composition of the invention is due to the 1,4-dithiocyanobutene-2.

We claim:

1. An insecticidal composition comprising a major proportion of petroleum spirits, a substantial proportion of methylethyl ketone and a lesser proportion of 1,4-dithiocyanobutene-2.

2. An insecticidal composition comprising a major proportion of petroleum spirits, a substantial proportion of methyl ethyl ketone and about 5% of 1,4-dithiocyanobutene-2.

3. An insecticidal composition comprising about 38% methyl ethyl ketone, about 57% petroleum spirits, and about 5% 1,4-dithiocyanobutene-2.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 2,135,987 | Murphy | Nov. 8, 1938 |

OTHER REFERENCES

Muller et al., Chem. Abstracts, vol. 30, page 7537 (1936).

Frear, "Chem. of Insecticides, Fungicides, and Herbicides," D. Van Nostrand Co., New York, 2nd ed. (1948), pages 91–93.